United States Patent
Matherne et al.

(10) Patent No.: US 7,178,626 B2
(45) Date of Patent: Feb. 20, 2007

(54) METHOD OF SEISMIC EVALUATION OF SUBTERRANEAN STRATA

(76) Inventors: Lee Matherne, 615 N. Landry Dr., New Iberia, LA (US) 70563; Radivoj Drecun, 615 N. Landry Dr., New Iberia, TX (US) 70563

( * ) Notice: Subject to any disclaimer, the term of this patent is extended or adjusted under 35 U.S.C. 154(b) by 364 days.

(21) Appl. No.: 10/966,118

(22) Filed: Oct. 15, 2004

(65) Prior Publication Data

US 2006/0081414 A1    Apr. 20, 2006

(51) Int. Cl.
G01V 1/04 (2006.01)
E21B 47/14 (2006.01)
G01V 1/40 (2006.01)
E21B 7/24 (2006.01)

(52) U.S. Cl. ........................ 181/121; 181/113; 181/106; 175/1; 175/56

(58) Field of Classification Search ............... 181/121, 181/113, 108, 106, 114, 102; 367/57; 175/1, 175/56
See application file for complete search history.

(56) References Cited

U.S. PATENT DOCUMENTS

| | | | | |
|---|---|---|---|---|
| 2,816,618 A | * | 12/1957 | Piety ........................... | 181/112 |
| 3,251,424 A | * | 5/1966 | Brooks ......................... | 175/56 |
| 3,353,362 A | * | 11/1967 | Lubinski ...................... | 405/228 |
| 3,702,635 A | * | 11/1972 | Farr ............................. | 166/299 |
| 3,804,182 A | * | 4/1974 | Adair et al. .................... | 175/1 |
| 3,824,797 A | * | 7/1974 | Wisotsky ...................... | 405/228 |
| 4,474,250 A | * | 10/1984 | Dardick ......................... | 175/1 |
| 4,867,096 A | * | 9/1989 | Cole .............................. | 181/114 |
| 4,993,001 A | * | 2/1991 | Winbow et al. ............. | 367/144 |
| 5,031,158 A | * | 7/1991 | Chamuel ..................... | 367/118 |
| 5,109,947 A | * | 5/1992 | Rector, III ................... | 181/106 |
| 5,159,160 A | * | 10/1992 | Brett ............................ | 181/106 |
| 5,160,814 A | * | 11/1992 | Petermann ................... | 181/106 |
| 5,372,207 A | * | 12/1994 | Naville et al. ................ | 175/1 |
| 5,438,170 A | * | 8/1995 | Klaveness .................... | 181/106 |
| 6,039,508 A | * | 3/2000 | White ........................... | 405/232 |
| 6,094,401 A | * | 7/2000 | Masak et al. ................. | 367/84 |
| 6,262,941 B1 | * | 7/2001 | Naville ......................... | 367/82 |
| 6,263,283 B1 | | 7/2001 | Snider et al. | |
| 6,382,332 B1 | | 5/2002 | Eaton | |
| 6,394,221 B2 | | 5/2002 | Cosma | |
| 6,429,784 B1 | | 8/2002 | Beique et al. | |
| 6,473,696 B1 | | 10/2002 | Onyia et al. | |
| 6,478,107 B1 | * | 11/2002 | Birchak et al. ............. | 181/113 |

* cited by examiner

*Primary Examiner*—Edgardo San Martin
(74) *Attorney, Agent, or Firm*—Ted M. Anthony

(57) ABSTRACT

A method of conducting seismic evaluation of a subterranean formation wherein a rigid, elongate member having a first end and a second end is positioned such that the first end of the elongate member is at a point on the earth's surface, imparting an impulsive force to the elongate member to urge the member into the earth, the positioning of the rigid member and the impulsive force being sufficient to generate and propagate primary seismic waves into the subterranean formation and positioning one or more seismic wave detectors on the surface of the earth to detect and receive reflected seismic waves from the subterranean formation.

12 Claims, 1 Drawing Sheet

METHOD OF SEISMIC EVALUATION OF SUBTERRANEAN STRATA

CROSS REFERENCES TO RELATED APPLICATIONS

None

STATEMENTS AS TO RIGHTS TO INVENTIONS MADE UNDER FEDERALLY SPONSORED RESEARCH AND DEVELOPMENT

None

The present invention relates to a method of generating seismic energy in order to evaluate subterranean strata. More particularly, the present invention relates to a method of generating acoustic waves from subterranean formations by impulsively inserting an elongate member into the earth's crust. More particularly still, the present invention relates to a seismic survey method using a percussively driven member, e.g., a hammer or other driving device, to transmit a repetitive impact to a rigid member, e.g., drive pipe, piling or the like, to generate and propagate high energy acoustic waves into subterranean strata in the seismic survey area and receiving reflected acoustic waves from the subterranean strata for the purpose of evaluating the subterranean strata.

Seismic data is routinely used to probe beneath the surface of the earth. Interpretation of seismic data is commonly used as an aid in searching for deposits of oil, gas, water and/or other valuable resources. Seismic data is also used in connection with engineering, archeological and scientific studies.

In today's oil and gas industry, seismic surveys are routinely used in connection with the exploration for, and development of, oil and gas reservoirs and, sometimes more importantly, identifying hazardous conditions before drilling into same. Such seismic surveys are generally performed by imparting seismic energy, typically in the form of primary, acoustic waves having a known amplitude and frequency pattern, into subterranean formations at one or more locations. The acoustic waves travel through the earth's crust, are reflected and/or refracted by subterranean formations, and are then detected and recorded at one or more distant locations using one or more recording devices situated in predetermined patterns or arrays. The time delay existing between the imparting of the primary, acoustic wave at a source location and the detection of the wave at one or more distant receiver locations frequently provides information about the depth at which particular reflecting geological interfaces are located. Ideally, such seismic data can be analyzed to determine both the location and characteristics of various subterranean strata in the general vicinity of the seismic survey. Such information can often be critical in both the hunt for, and harvesting of, hydrocarbon accumulations.

Conventional seismic energy sources currently fall into three broad categories: mechanical, explosive and vibratory. Mechanical seismic energy sources include the use of sledge hammers to strike against metal plates mounted at the earth's surface. A sledge hammer is used to strike the plate vertically to generate "P" waves, and horizontally (against the side of the plate) to generate "S" waves. Similarly, accelerated weight drop systems employing compressed air or thick elastic slings can also be used to mechanically generate seismic energy.

Explosive sources of seismic energy include the detonation of dynamite, firing of shotgun shells or discharge of compressed gases. Such explosions impact the ground and generate seismic pulses that can be received and interpreted. Unfortunately, such explosive sources of seismic energy can frequently be dangerous and/or disruptive to the surrounding environment.

Vibratory sources of seismic energy typically employ so-called vibroseis devices. Such vibroseis devices generate a relatively long oscillatory wavetrain, and utilize metal plates to vibrate the ground in order to create seismic signals. Generally, vibroseis tools are considered less damaging to the ground and surface structures than other sources of seismic energy because the signals generated by such vibroseis devices have relatively low amplitudes.

Currently, generation of seismic energy and collection and/or recordation of such seismic data is typically performed at or near the surface of the earth, or on the sea floor. Mechanical, explosive and vibratory sources of seismic energy have conventionally been employed at or near the earth's surface in order to generate shear and compressional waves in subterranean strata. In some cases, seismic sources have also been deployed in subterranean boreholes penetrating in the earth's crust in order to generate acoustic waves from locations beneath the earth's surface or the sea floor.

Sensors or recorders designed to collect acoustic waves are frequently positioned at different locations relative to such source(s) of seismic energy. In most cases, such sensors or recorders are positioned in predetermined patterns or arrays. Frequently, such sensors or arrays are arranged in order to form a line. By changing the location of the source(s) of seismic energy, the positioning of the sensor array(s), or both, the transmission characteristics of a section of earth can be measured. In this manner, a three-dimensional map of subsurface strata throughout a particular region of earth can be produced. Such maps can be critical tools for the exploration and/or development of oil and gas reservoirs.

In many cases, seismic surveys are conducted prior to the actual drilling of any wells. That is, seismic information is generated, collected and analyzed well before any drilling operations are actually commenced. In practice, it has become increasingly common to locate oil and gas wells, and to design drilling parameters of such wells, based entirely or in large part upon the interpretation of seismic data. However, there is no existing method for generating and collecting seismic data using the actual drilling process. Further, there is no existing method for generating, collecting, analyzing and interpreting such seismic data in real time without interrupting the drilling process. Such information would be extremely valuable for real time, or "just-in-time", evaluation of reservoir(s) to be accessed by a well and before such well is actually drilled, as well as the rock characteristics, pore pressures and geologic conditions to be encountered during the drilling process in certain circumstances. Moreover, such information could be used in place of pre-drilling seismic surveys.

Frequently, especially in offshore operations, a large diameter pipe, known as drive pipe or conductor pipe, is driven into the surface of the earth as one of the initial steps of the drilling process. The drive pipe, which can be installed up to several hundred feet into the earth, provides mechanical integrity for the ongoing drilling process in unconsolidated formations near the earth's surface. After the drive pipe has been set, a well can be drilled deeper out of the drive pipe.

Drive pipe is typically driven into the surface of the earth using large hammers which essentially serve as pile drivers. Such hammers are used to strike the upper surface of the drive pipe in a downward direction, thereby forcing the drive pipe axially into the earth's crust. With each blow of the hammer, the drive pipe advances deeper into the earth's crust until penetration stops, or until a predetermined depth is reached.

During this driving process, significant energy is transferred from the hammer to the drive pipe, either directly or indirectly. Because the drive pipe is in engagement with the earth and subsequently at least partially inserted into the surface of the earth, this energy is transferred from the drive pipe to the subterranean strata in the general vicinity of the pipe-driving operation, i.e., the survey area. The energy imparted by a hammer striking the drive pipe is converted to acoustic waves, which waves in turn travel through subterranean strata in the survey area. These acoustic waves, which are reflected/refracted by subterranean strata, can be collected and analyzed using sensors or recorders, well known in the art, which are oriented in predetermined patterns or arrays. The seismic information obtained in this manner can be evaluated in order to map such subterranean strata and immediately understand the characteristics and possible life threatening risks below.

In many cases, energy is transferred from a hammer to drive pipe at or near the upper surface of such drive pipe. However, it is to be observed that such energy does not have to be imparted only at or near the upper surface of such pipe in order to generate the desired acoustic waves. For example, an internal hammer may be used to drive pipe at or near the lower extent of such pipe, even when the pipe is driven into subterranean strata. Under such a scenario, beneficial acoustic waves would result even though the drive pipe is not hammered at or near its upper extent.

In one preferred embodiment of the present invention there is provided a method useful in conducting seismic exploration of subterranean strata wherein repetitive, high energy seismic signals from a rigid member being impulsively driven into the earth are propagated to a subterranean location and reflected waves are collected and analyzed during the drilling of a well without interrupting the drilling process.

In accordance with the present invention, as embodied and broadly described herein, one preferred embodiment relates to a method of conducting seismic evaluation of a subterranean formation comprising providing a rigid, elongate member having a first end and a second end, positioning the first end of the elongate member at a point on the earth's surface, imparting an impulsive force to the elongate member to urge the member into the earth, the positioning of the rigid member and the impulsive force being sufficient to generate and propagate primary seismic waves into the subterranean formation, and positioning one or more seismic wave detectors on the surface of the earth to detect and receive reflected seismic waves from the subterranean formation.

DESCRIPTION OF THE ILLUSTRATED EMBODIMENTS

Figure 1:
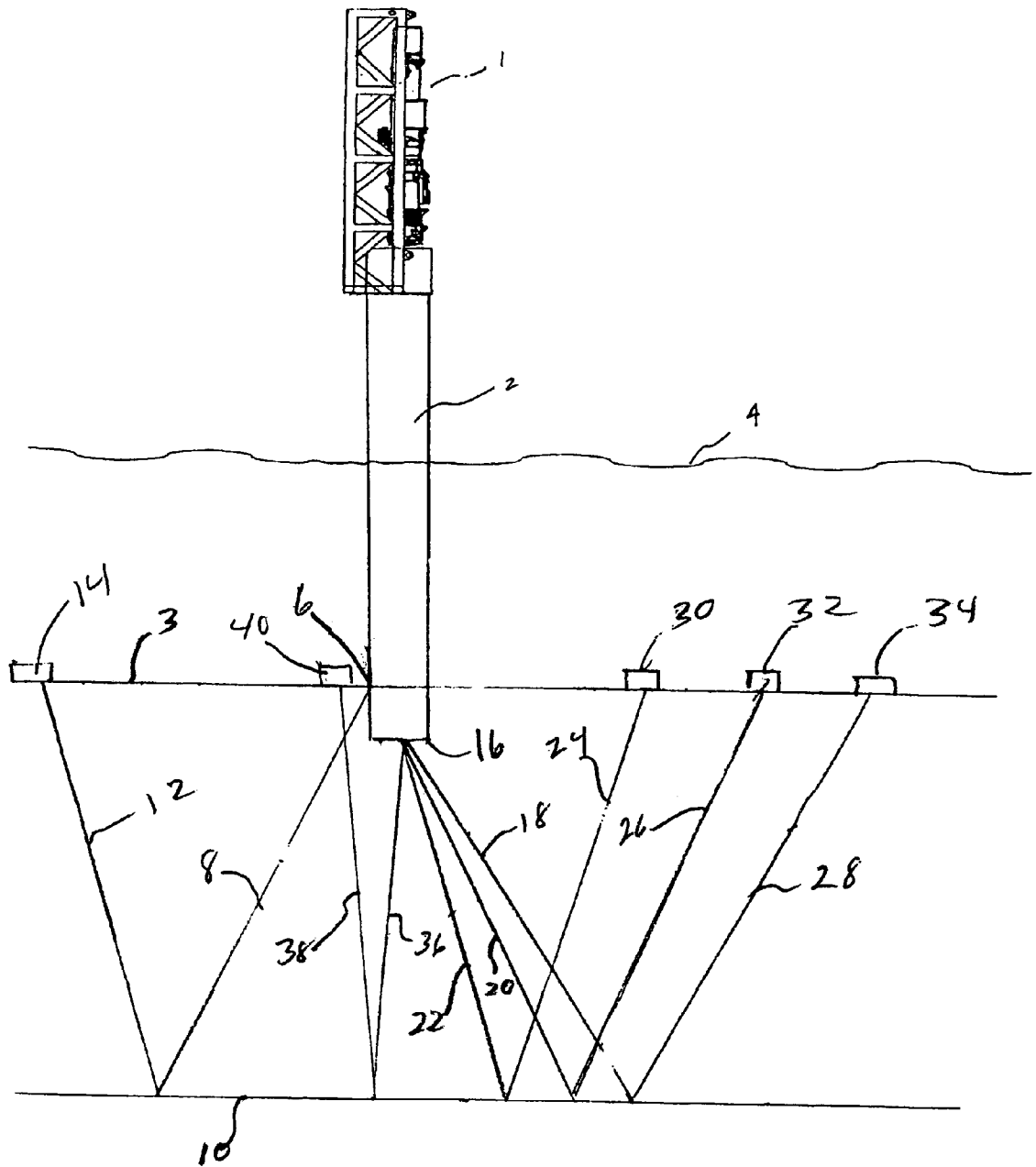
FIG. 1 depicts a schematic view of the method of the present invention.

While the present invention will be described with particular reference to the use of a hammer to drive a tubular member such as drive pipe into the earth's crust, it is to be understood that it is not so limited. The same or similar results can be obtained using other rigid members and other impulsive force drivers, e.g., vibratory drivers, to force the rigid member(s) into the earth. Thus, elongate rigid members such as piling, H-beam, I-beam, timber or the like can be employed in the method of the present invention. Additionally, it is to be observed that not all driving of pipe during well drilling operations commences at the earth's surface. For example in some circumstances or environments, it may be beneficial to wash, jet or drill such pipe some distance into the earth's crust before commencing the pipe-driving or hammering process.

During the driving process, when an elongate member is driven into the earth's crust by virtue of impulsive force, at least three (3) distinct sources of seismic waves can be identified. These sources of seismic energy are as follows:

1. Surface Source of Seismic Energy: Compression, tension and shear waves are generated by the initial impact as well as any subsequent impact at the surface of the earth into which the rigid elongate member is being driven. In other words, while the initial impact of the rigid member in the earth sends out seismic waves, a subsequent impact on the rigid member also sends out seismic waves at the intersection of the earth and the rigid member. These waves which can be referred to as primary, surface waves travel along a wavefront and are reflected and refracted as they encounter subterranean formations having different physical properties. In the case of these surface waves, the center of the wavefront remains at the intersection of the rigid member, whatever its position, and the earth's surface. Generally speaking, the wavefront of the surface waves has a spherical shape.

2. Vibration Source of Seismic Energy: Axial impact of a hammer or other driving device on an elongate member will cause the elongate member to vibrate. Such vibration will generate compressional, tensional and shear waves that travel mostly horizontally and, as a result, create more shear energy. The shape of this wavefront is generally elliptical and its subterranean location will move as the penetration of the elongate member increases. The recording of such shear waves enhances the chances for predicting presence of hydrocarbon accumulations, and shallow gas clouds, commonly referred to as "chimneys" which history has proven can be deadly.

3. Bottom Source of Seismic Energy: As the bottom of an elongate member impacts subsurface strata, seismic energy is generated and propagates in upward and downward directions. This creates up-going and down-going wave paths. Since some of the waves (up-going) travel straight to receivers situated at the earth's surface, the amount of earth filtering is minimal. As a result, this energy can be used for high frequency restoration of seismic data.

In the case of drive pipe driven by a hammer or other percussive device, energy is generated at the point of impact of the hammer on the drive pipe. This energy is propagated through the pipe onto and into the earth, depending on the position of the drive pipe. This energy appears as primary seismic waves which propagate toward a target, subterranean formation. The primary waves are reflected and refracted as they encounter subterranean strata exhibiting different elastic properties.

The wave front generated at the intersection of the drive pipe and the earth's surface, as noted above, will have a substantially spherical shape, and the center of the wavefront will remain located at the earth/drive pipe interface.

Impact of a hammer on the drive pipe, e.g., from the side as well as vertically, will typically cause the pipe to resonate. Such resonance of the pipe also generates compressional and shear waves that travel in a direction transverse to the pipe axis, e.g., in a substantially horizontal direction. As a result, more shear than compressional energy is typically created. The shape of this wavefront is generally elliptical and its subsurface position moves as the penetration of the pipe increases. Such shear waves generated down hole by the resonance and/or vibration of the pipe are particularly useful for predicting presence of hydrocarbons, and/or distinguishing hydrocarbons from non-commercial deposits or formations.

Resonance and/or vibration of an elongate member such as drive pipe, and the acoustic waves resulting from such resonance or vibration, can often be enhanced by adding "glancers" to such elongate members. Such glancers can take the form of one or more rigid extensions or wings rigidly attached to and extending laterally outwardly from the elongate member(s). As an elongate member vibrates, such glancers alter the shape of shear waves traveling through subterranean formations. Such shear waves allow for a greater ability to evaluate rock and fluid characteristics associated with such subterranean formations.

Seismic energy generated at the lower end of the drive pipe propagates vertically in both upward and downward directions, i.e., up-going and down-going waves. Some of the upward traveling waves travel straight to the receivers at the surface, again minimizing the negative effect of "earth filtering." As a result, this type of seismic energy can be especially useful for high frequency restoration of seismic data.

As set forth above, it is to be observed that the method of seismic evaluation described herein can be accomplished by driving any number of different elongate members into the earth's crust. However, the present invention is particularly beneficial when performed as part of, or incident to the well drilling process. Seismic data obtained during the drilling process can allow a driller to quickly alter a planned well path to optimize such well's chances of encountering commercial hydrocarbon accumulations and/or favorable subsurface conditions. In some cases, such seismic evaluation may be used to condemn a drilling project in its early stages before significant costs have been incurred. Similarly, such data can also be used to determine formation and pore pressure characteristics in advance, thereby providing a valuable tool that can be used both in the drilling and in connection with casing and production string placement and design.

Referring to the drawings, FIG. 1 depicts a simplified, schematic view of the method of the present invention. Hammer 1 is used to drive tubular drive pipe 2 longitudinally into earth's surface 3. Because FIG. 1 depicts a marine environment, water line 4 is shown above earth's surface 3. As hammer 1 impacts drive pipe 2 forcing drive pipe 2 in a downwardly direction into the earth's crust, energy is transferred from the hammer 1 to the drive pipe 2. The energy being transferred from the hammer 1 to the drive pipe 2 creates a source of surface seismic energy which emanates from the intersection 6 of drive pipe 2 and the earth surface 3. These primary, surface waves, indicated as 8, have a vertical component as well as a shear, generally horizontal component (not shown). In any event, as the surface wave 8 impacts the target formation indicated as 10, a reflected seismic wave indicated at 12 is produced which is detected and received at hydrophone 14.

The end 16 of drive pipe 2 is a source of bottom, primary seismic waves 18, 20 and 22 which when they strike the target formation 10 generate reflected waves 24, 26 and 28 which are detected and received at hydrophones 30, 32 and 34, respectively. As noted above, some of the bottom waves emanate from the end 16 of drive pipe 2 in a generally vertical direction as shown by primary seismic wave 36. Upon impacting the target formation 10, a reflected wave 38 which is an up-going wave is reflected where it is detected and received at hydrophone 40. As noted above, these up-going waves are traveling substantially in a straight line to the hydrophones located at the earth's surface 3. Accordingly, the amount of earth filtering is minimal making these seismic waves particularly useful for high frequency restoration of seismic data.

In the description above, reference has been made to the generation and detection of reflected seismic waves, it will be understood that, as in the case of all synthetic generation of seismic waves, generally two types of waves result; refracted waves in which the principal portion of the wave path is along the inner-face between two rock layers and hence is approximately horizontal, and reflected waves in which the wave travels downward initially and at some point is reflected back to the surface, the overall path being generally vertical.

Many types of percussive force imparting apparatus' can be employed in the method of the present invention. For example, diesel hammers, double-acting hammers, drop hammers, hydraulic hammers, internal drop hammers, etc., can all be employed.

As indicated above, the method of the present invention can be employed in the drilling process without interruption of the process. In this regard, and as well known to those skilled in the art, it is common, particularly in offshore locations, and as an initial (or early) part of the well drilling process, to hammer drive pipe or conductor pipe into the earth, the drive pipe thereby forming the upper portion of the well. Thus, in this phase of the drilling operation, i.e., driving of the drive pipe, the seismic survey method of the present invention can be carried out. Further, the positioning of hydrophones, geophones or other seismographic detection and recording apparatus do not interfere with this phase of the drilling operation.

It will be understood that once the seismic data is acquired, e.g., by the hydrophones, geophones or the like, it is processed by sophisticated data processing techniques which can provide detailed information about the subterranean formations being investigated.

The above disclosed invention has a number of particular features which should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. A method of conducting seismic evaluation of a subterranean formation comprising:
   providing a rigid, elongate member having a first end and a second end;
   positioning said first end of said elongate member at a point on the earth's surface;

imparting an impulsive force to said elongate member to urge said elongate member into the earth, said positioning of said elongate member and said impulsive force being sufficient to generate and propagate primary seismic waves into said subterranean formation; and positioning one or more seismic wave detectors on the surface of the earth to detect and receive reflected seismic waves from said subterranean formation.

2. The method of claim 1, wherein said rigid, elongate member is a tube.

3. The method of claim 2, wherein said tube is drive pipe.

4. The method of claim 1, wherein said rigid elongate member has at least one rigid extension projecting laterally outwardly from said rigid elongate member.

5. The method of claim 1, wherein said impulsive force is imparted to said elongate member by a percussive action.

6. The method of claim 5, wherein said percussive action is accomplished by using a hammer.

7. The method of claim 5, wherein said percussive action is accomplished by using a vibratory driver.

8. The method of claim 3, wherein said urging of said drive pipe into the earth is part of a well drilling operation.

9. A method of conducting seismic evaluation of a subterranean formation comprising:

providing a length of pipe having a first end and a second end;

jetting said first end of said length of pipe at least partially into the earths' crust;

imparting an impulsive force to said length of pipe to urge said length of pipe further into the earth, said impulsive force being sufficient to generate and propagate primary seismic waves into said subterranean formation; and positioning one or more seismic wave detectors on the surface of the earth to detect and receive reflected seismic waves from said subterranean formation.

10. The method of claim 9, wherein said section of pipe has at least one rigid extension projecting externally outwardly from said section of pipe.

11. The method of claim 9, wherein said impulsive force is imparted to said section of pipe by a percussive action.

12. The method of claim 11, wherein said percussive action is accomplished using a hammer.

* * * * *